US012291918B2

(12) United States Patent
Tsutsui et al.

(10) Patent No.: US 12,291,918 B2
(45) Date of Patent: May 6, 2025

(54) CONTROL DEVICE, CONTROL METHOD, AND STORAGE MEDIUM

(71) Applicants: KABUSHIKI KAISHA TOKAI RIKA DENKI SEISAKUSHO, Aichi (JP); MITSUI KINZOKU ACT CORPORATION, Kanagawa (JP)

(72) Inventors: Toshihiro Tsutsui, Aichi (JP); Shingo Mochizuki, Aichi (JP); Hibiki Ogura, Kanagawa (JP)

(73) Assignees: KABUSHIKI KAISHA TOKAI RIKA DENKI SEISAKUSHO, Aichi (JP); MITSUI KINZOKU ACT CORPORATION, Kanagawa (JP)

( * ) Notice: Subject to any disclaimer, the term of this patent is extended or adjusted under 35 U.S.C. 154(b) by 330 days.

(21) Appl. No.: 17/858,491

(22) Filed: Jul. 6, 2022

(65) Prior Publication Data

US 2023/0042549 A1 Feb. 9, 2023

(30) Foreign Application Priority Data

Aug. 4, 2021 (JP) ................................ 2021-128270

(51) Int. Cl.
*E05F 15/659* (2015.01)
*E05F 15/662* (2015.01)

(52) U.S. Cl.
CPC .......... *E05F 15/659* (2015.01); *E05F 15/662* (2015.01)

(58) Field of Classification Search
CPC .............................. E05F 15/659; E05F 15/662
See application file for complete search history.

(56) References Cited

U.S. PATENT DOCUMENTS

| | | | | |
|---|---|---|---|---|
| 6,425,206 | B1 * | 7/2002 | Noda | E05F 15/638 49/506 |
| 7,906,926 | B2 * | 3/2011 | Nagakura | H02P 29/0016 318/434 |
| 9,371,687 | B2 * | 6/2016 | Yu | E06B 9/262 |
| 9,611,689 | B2 * | 4/2017 | Blair | E06B 9/24 |
| 9,790,727 | B2 * | 10/2017 | Nishikibe | B60J 5/047 |
| 2015/0034257 | A1 * | 2/2015 | Blair | E06B 9/264 160/405 |
| 2016/0208538 | A1 * | 7/2016 | Nishikibe | B60J 5/047 |
| 2020/0340287 | A1 * | 10/2020 | Nishizuka | E05B 81/78 |

FOREIGN PATENT DOCUMENTS

| | | |
|---|---|---|
| JP | H06-328940 | 11/1994 |
| JP | H11-324482 | 11/1999 |
| JP | 2013-002112 | 1/2013 |
| JP | 2014-194151 A | 10/2014 |

* cited by examiner

*Primary Examiner* — Thai T Dinh
(74) *Attorney, Agent, or Firm* — GREENBLUM & BERNSTEIN P.L.C.

(57) ABSTRACT

A control device includes a control section configured to control opening and closing of a structure. the control section controls an opening operation or a closing operation of the structure to match an operation direction of the structure obtained by a sensor provided to the structure, and the control section further controls the closing operation of the structure until the structure is fully closed when the operation direction of the structure obtained by the sensor is a closing direction, and controls the opening operation of the structure until the structure is fully opened when the operation direction of the structure obtained by the sensor is an opening direction.

6 Claims, 4 Drawing Sheets

CONTROL DEVICE, CONTROL METHOD, AND STORAGE MEDIUM

CROSS REFERENCE TO RELATED APPLICATION(S)

This application is based upon and claims benefit of priority from Japanese Patent Application No. 2021-128270, filed on Aug. 4, 2021, the entire contents of which are incorporated herein by reference.

BACKGROUND

The present invention relates to a control device, a control method, and a storage medium.

In recent years, a technology that controls opening and closing of a structure such as a door has been developed. For example, JP 2014-194151 A discloses a technology that performs control for causing an electric motor to generate a brake force and stopping opening and closing of a slide door when a halfway stop signal is input while the slide door is opened or closed.

SUMMARY

However, the technology disclosed in JP 2014-194151 A has difficulty in performing control for assisting opening or closing when a user performs an operation of opening or closing the door. When, for example, manually opening or closing the door, the user has had to open or close the door to the end.

Therefore, the present invention is made in view of the aforementioned issues, and an object of the present invention is to provide a new and improved control device, control method, and storage medium that can further reduce a user's burden.

To solve the foregoing problem, according to an aspect of the present invention, there is provided a control device comprising a control section configured to control opening and closing of a structure, wherein the control section controls an opening operation or a closing operation of the structure to match an operation direction of the structure obtained by a sensor provided to the structure, and the control section further controls the closing operation of the structure until the structure is fully closed when the operation direction of the structure obtained by the sensor is a closing direction, and controls the opening operation of the structure until the structure is fully opened when the operation direction of the structure obtained by the sensor is an opening direction.

To solve the foregoing problem, according to another aspect of the present invention, there is provided a control method that is executed by a computer, the control method comprising controlling an opening operation or a closing operation of a structure to match an operation direction of the structure obtained by a sensor provided to the structure, further controlling the closing operation of the structure until the structure is fully closed when the operation direction of the structure obtained by the sensor is the closing operation, and controlling the opening operation of the structure until the structure is fully opened when the operation direction of the structure obtained by the sensor is the opening direction.

To solve the foregoing problem, according to still another aspect of the present invention, there is provided a non-transitory computer readable storage medium having a program stored therein, the program causing a computer to realize a control function configured to control opening and closing of a structure, wherein the control function controls an opening operation or a closing operation of the structure to match an operation direction of the structure obtained by a sensor provided to the structure, and the control function further controls the closing operation of the structure until the structure is fully closed when the operation direction of the structure obtained by the sensor is a closing direction, and controls the opening operation of the structure until the structure is fully opened when the operation direction of the structure obtained by the sensor is an opening direction.

As described above, the present invention can further reduce a user's burden.

DETAILED DESCRIPTION OF THE EMBODIMENT(S)

Figure 1:
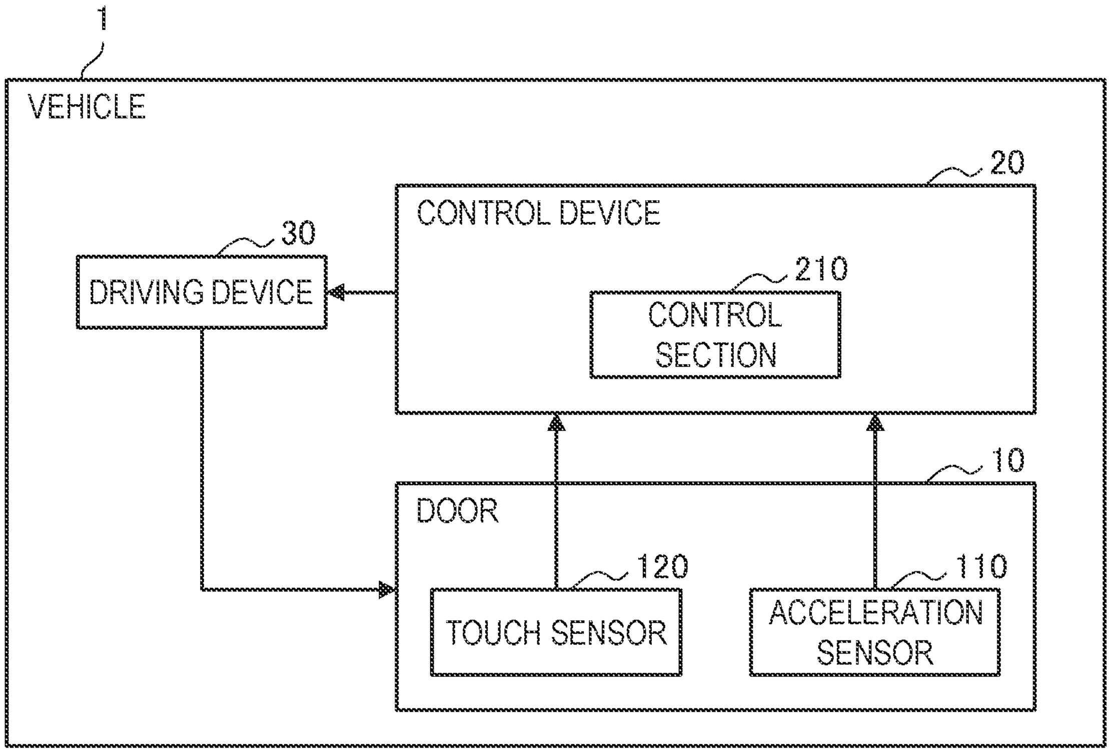
FIG. 1 is a block diagram illustrating a configuration example of a vehicle according to the present embodiment.

A preferred embodiment of the present invention will be described in detail below with reference to the accompanying drawings. Note that components employing substantially identical components will be assigned identical reference numerals in this description and drawings, and overlapping description thereof will be omitted.

<1. Vehicle Configuration Example>

First, a schematic configuration of a vehicle 1 according to the present embodiment will be described with reference to FIG. 1. FIG. 1 is a block diagram illustrating a configuration example of the vehicle according to the present embodiment.

As illustrated in FIG. 1, the vehicle 1 according to the present embodiment includes a door 10, a control device 20, and a driving device 30.

(Vehicle 1)

The vehicle 1 is an example of a movable body. The vehicle 1 is, for example, a vehicle that is used by a user. The vehicle 1 is, for example, a vehicle that is owned by the user or a vehicle that is temporarily lent to the user. Note that the movable body according to the present embodiment includes not only the vehicle 1 but also an airplane or a ship.

(Door 10)

The door 10 is an example of a structure. The door 10 is a door that is provided to the vehicle 1. By, for example, opening or closing the door 10, the user can get on the vehicle 1 or get off the vehicle 1. Note that the door 10 according to the present embodiment may be a front door of the vehicle 1, or may be a rear door. Furthermore, although this description will mainly describe the door 10 as a hinge type door, the door 10 may be a slide type door. Furthermore, the structure according to the present invention may be an arbitrary structure a shutter or a lid that is operated to open or close.

Furthermore, the door 10 according to the present embodiment is opened or closed via the driving device 30 according to control of the control device 20 described later.

The door 10 according to the present embodiment includes an acceleration sensor 110 and a touch sensor 120 as illustrated in FIG. 1.

{Acceleration Sensor 110}

The acceleration sensor 110 is an example of a sensor. The acceleration sensor 110 obtains information related to an operation direction of the door 10. For example, the acceleration sensor 110 obtains information related to whether the operation direction of the door 10 is an opening direction or a closing direction. Furthermore, the acceleration sensor 110 outputs the obtained information related to the operation direction of the door 10 to the control device 20. Details on the opening direction or the closing direction will be described later.

Furthermore, the sensor according to the present embodiment may be an arbitrary sensor that can detect the operation direction instead of the acceleration sensor 110. For example, the sensor may be a sensor that detects a pulse of a motor that fluctuates based on the operation direction of the door 10. Furthermore, when the door 10 is the hinge type door, the sensor according to the present embodiment may be a sensor that measures a revolving motion of the door with respect to a hinge revolving shaft by an angular velocity sensor.

{Touch Sensor 120}

The touch sensor 120 is an example of another sensor. The touch sensor 120 is a sensor that detects user's contact. The another sensor according to the present invention may be an arbitrary sensor that can decide whether or not the user contacts the door 10. For example, the another sensor may be an imaging sensor, and the imaging sensor may detect whether or not the user contacts the door 10. Furthermore, the touch sensor 120 outputs information related to the detected user's contact to the control device 20. Note that the vehicle 1 according to the present embodiment may not necessarily need to be provided with the touch sensor 120.

(Control Device 20)

The control device 20 controls an entire operation of the vehicle 1. As illustrated in FIG. 1, the control device 20 includes a control section 210.

The control section 210 controls an entire operation of the control device 20. For example, the control section 210 controls opening or closing of the door 10. Furthermore, the control section 210 controls the opening operation or the closing operation of the door 10 to match the operation direction of the door 10 obtained by the sensor provided to the door 10. Furthermore, the control section 210 controls the closing operation of the door 10 until the door 10 is fully closed when the operation direction of the door 10 obtained by the acceleration sensor 110 is the closing direction. Furthermore, the control section 210 controls the opening operation of the door 10 until the door 10 is fully opened when the operation direction of the door 10 obtained by the acceleration sensor 110 is the opening direction.

When, for example, the acceleration sensor 110 obtains the information related to the operation direction of the door 10 as a motion from a state where the door 10 stops, the control section 210 controls the opening operation or the closing operation of the door 10. In this regard, the state where the door 10 stops includes, for example, a state where the door 10 is at a final position of the closing operation (i.e., a state where the door 10 is closed), or a state where the door 10 is at a final position of the opening operation (i.e., a state where the door 10 is fully opened). Furthermore, the state where the door 10 stops includes a state where the door 10 stops at a halfway position of the opening operation or the closing operation.

The control section 210 functions as an arithmetic processing device or a control device, and controls all or part of operations of each component of the control device 20 based on various programs recorded in a Read Only Memory (ROM), a Random Access Memory (RAM) or a removable recording medium.

The control section 210 is realized by, for example, a processor such as a Central Processing Unit (CPU) or a Micro Controller Unit (MCU). Furthermore, the control section 210 may be realized by an Electronic Control Unit (ECU) that is mounted on the vehicle 1, or a microcomputer that is mounted on the ECU.

(Driving Device 30)

The driving device 30 causes the door 10 to operate according to control of the control section 210. For example, the driving device 30 causes the door 10 to operate in the opening direction according to control related to the opening operation of the control section 210. Furthermore, the driving device 30 causes the door 10 to operate in the closing direction according to control related to the closing operation of the control section 210. The driving device 30 may be an arbitrary actuator that can cause the door 10 to operate.

The configuration example of the vehicle 1 according to the present embodiment has been described above. Next, details according to the present embodiment will be described with reference to FIG. 2.

<2. Details>

Figure 2:
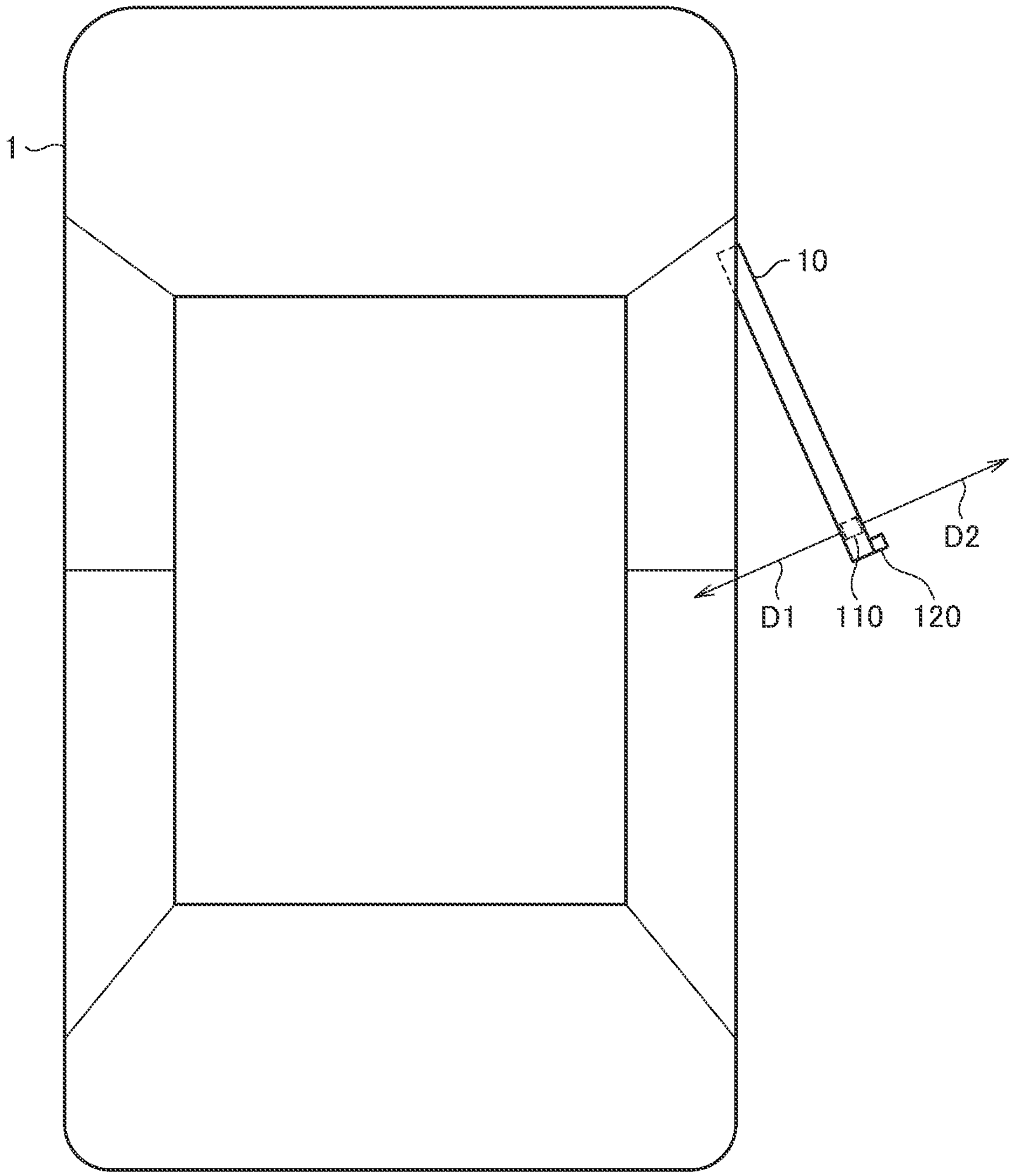
FIG. 2 is a bird's-eye view illustrating the vehicle according to the present embodiment.

FIG. 2 is a bird's-eye view of the vehicle according to the present embodiment. As illustrated in FIG. 2, a direction to close the door 10 with respect to the vehicle 1 will be referred to as a closing direction D1, and a direction to open the door 10 will be referred to as an opening direction D2.

Furthermore, the acceleration sensor 110 is built in the door 10 at such an orientation that the acceleration sensor 110 can detect an acceleration in the closing direction D1 and the opening direction D2 of the door 10. Note that the acceleration sensor 110 may be installed on a surface of the door 10.

The control section 210 obtains the operation direction of the door from the acceleration sensor 110 provided to the door 10. Next, the control section 210 outputs to the driving device 30 a signal for controlling the opening operation or the closing operation of the door 10 to match the obtained operation direction. Furthermore, the driving device 30 performs the opening operation or the closing operation of the door 10 according to control of the control section 210.

When, for example, the user pushes or pulls the door 10 in the closing direction D1, the acceleration sensor 110 obtains information related to the closing direction D1 of the door. Furthermore, the control section 210 controls the closing operation of causing the driving device 30 to cause the door 10 to operate in the closing direction D1.

Furthermore, when the user pushes or pulls the door 10 in the opening direction D2, the acceleration sensor 110 obtains information related to the opening direction D2 of the door. Furthermore, the control section 210 controls the opening operation of causing the driving device 30 to cause the door 10 to operate in the opening direction D2. Consequently, the control section 210 can assist a user's operation of opening/closing the door 10, and further reduce a user's burden.

Note that the control section 210 may perform control for moving the door 10 in a direction opposite to the operation direction of the door 10 obtained by the acceleration sensor 110.

Furthermore, the control section 210 may perform control for stopping the operation of the door 10 when the acceleration sensor 110 obtains the information related to the operation direction of the door 10.

When, for example, the door 10 is opened in the opening direction D2 due to a strong wind, the door 10 is concerned to hit the user or an object. Hence, when the acceleration sensor 110 obtains information related to the opening direction D2, the control section 210 may control the closing operation of causing the door 10 to operate in the closing direction D1 that is the direction opposite to the opening direction D2. Consequently, even when the door 10 is opened against a user's will, it is possible to prevent an assist operation of further opening the door 10 from being performed.

Furthermore, as an example of a method for deciding whether or not the door 10 is opened or closed based on the user's will, the touch sensor 120 may be provided on the surface of the door 10 as illustrated in FIG. 2. In this case, when the touch sensor 120 detects the user's contact, and the acceleration sensor 110 obtains the information related to the operation direction of the structure, the control section 210 may control the opening operation or the closing operation of the door 10 to match the operation direction.

More specifically, when the touch sensor 120 detects the user's contact, and the acceleration sensor 110 obtains the information related to the opening direction D2 of the door 10, the control section 210 may control the opening operation of causing the door 10 to operate in the opening direction D2. Furthermore, when the touch sensor 120 detects the user's contact, and the acceleration sensor 110 obtains the information related to the closing direction D1 of the door 10, the control section 210 may control the closing operation of causing the door 10 to operate in the closing direction D1.

Furthermore, when the touch sensor 120 does not detect the user's contact, and the acceleration sensor 110 obtains the information related to the operation direction of the door 10, the control section 210 may perform control for stopping the operation of the door 10. Consequently, when the door 10 is opened against the user's will, it is possible to stop the operation of the door 10, and it is possible to reduce a concern that the door 10 hits the user or an object when the door 10 is opened or closed against the user's will. Thus, the control section 210 uses the information related to the operation direction of the door 10 obtained by the acceleration sensor 110, and information related to the user's contact obtained by the touch sensor 120 in combination, so that it is possible to reduce a concern that the door 10 hits the user or the object due to that the door 10 is opened against the user's will while reducing the user's burden for opening or closing the door 10.

Furthermore, when a value detected by the acceleration sensor 110 satisfies a specified condition, the control section 210 may perform the opening operation or the closing operation of the door 10. When, for example, the user touches the door 10 to open the door 10, the acceleration sensor 110 obtains the information of the closing direction D1. Hence, when, for example, the value detected by the acceleration sensor 110 is a threshold or more, the control section 210 may perform the opening operation or the closing operation of the door 10. By excluding a value of an acceleration less than a specified value from control information, the control section 210 can accurately control the opening operation or the closing operation of the door 10.

Furthermore, the specified condition may be within a predetermined range. For example, the predetermined range may be a range of a value assumed based on the user's contact. Consequently, when, for example, a value outside the predetermined range is input to the acceleration sensor 110, the control section 210 may decide that the value is not based on the user's contact, and may not perform control for the opening operation or the closing operation of the door 10. Consequently, even when, for example, the door 10 is not provided with the touch sensor 120, the control section 210 can decide whether or not the information related to the operation direction and input to the acceleration sensor 110 is information that is based on the user's contact.

Figure 3:
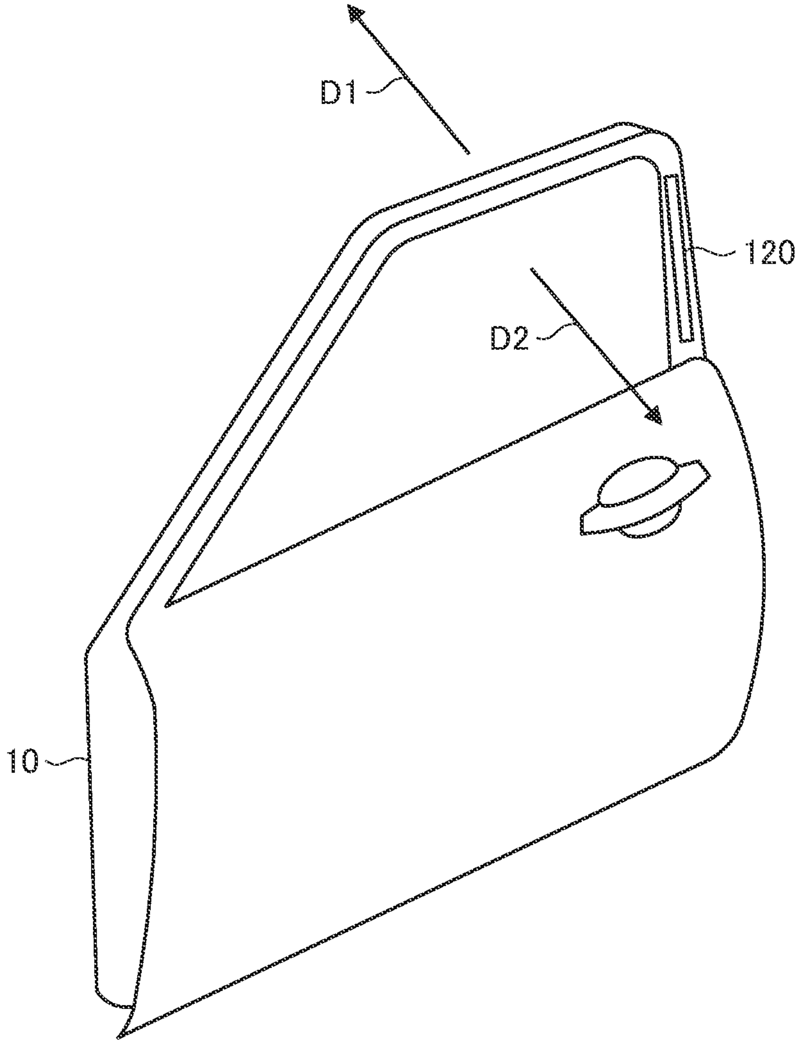
FIG. 3 is an explanatory view for describing an arrangement example of a touch sensor according to the present embodiment.

FIG. 3 is an explanatory view for describing an arrangement example of the touch sensor 120. The touch sensor 120 is desirably arranged at a position (a door trim on a door vehicle inner side) that is touched when, for example, the door 10 is pushed in the closing direction D1 illustrated in FIG. 3 (a vehicle outer side of a door frame rear end) or is pulled. According to the arrangement example of the touch sensor 120 illustrated in FIG. 3, the user can push or pull the door 10 in the closing direction D1 while touching the touch sensor 120. As a result, the user can be assisted by the driving device 30 by one operation to perform the operation of closing the door 10. In this regard, the arrangement of the touch sensor 120 is not limited to the example illustrated in FIG. 3. The touch sensor 120 only needs to be arranged at a position that the user can touch when opening or closing the door 10. Furthermore, the touch sensor 120 may be arranged at a position (the vehicle inner side at the door frame rear end) that is touched when the door 10 is pushed in the opening direction D2 (the door trim of the door vehicle inner side) or is pulled. In this case, the user can push or pull the door 10 in the opening direction D2 while touching the touch sensor 120. As a result, the user can be assisted by the driving device 30 by one operation to perform the operation of opening the door 10. The touch sensor 120 may be provided on both of an outer side and an inner side of the door 10. Thus, by using the touch sensor 120, it is possible to improve user friendliness for getting on or off the vehicle 1.

The details according to the present embodiment has been described above. Next, an operation process example of the control device 20 according to the present embodiment will be described with reference to FIG. 4.

<3. Operation Process Example>

Figure 4:
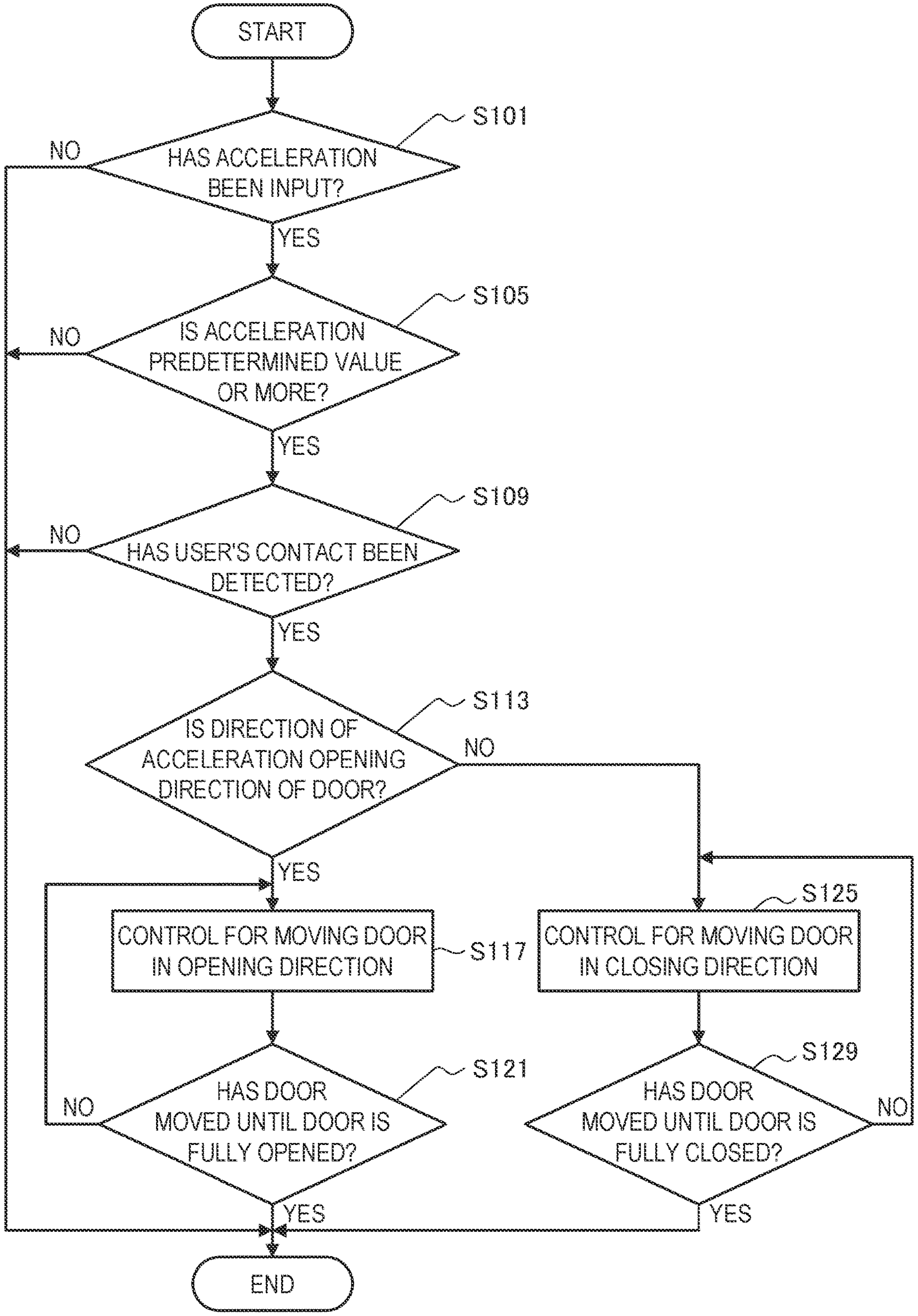
FIG. 4 is a flowchart illustrating for describing an operation process example of a control device according to the present embodiment.

FIG. 4 is a flowchart for describing an operation process example of the control device 20 according to the present embodiment. First, the control section 210 decides whether or not the acceleration has been input from the acceleration sensor 110 (S101). When the acceleration is input (S101/Yes), the control section 210 advances a process to S105, and, when the acceleration is not input (S101/No), the control section 210 finishes the process.

When the acceleration is input (S101/Yes), the control section 210 decides whether or not the input acceleration is a predetermined value or more (S105). When the acceleration is the predetermined value or more (S105/Yes), the control section 210 advances the process to S109 and, when the acceleration is less than the predetermined value (S105/No), the control section 210 finishes the process.

When the acceleration is the predetermined value or more (S105/Yes), the control section 210 decides whether or not the touch sensor 120 has detected the user's contact (S109). When the user's contact is detected (S109/Yes), the control section 210 advances the process to S113. When the user's contact is not detected (S109/No), the control section 210 finishes the process.

When the user's contact is detected (S109/Yes), the control section 210 decides whether or not a direction of the input acceleration is the opening direction of the door 10

(S113). When the direction of the input acceleration is the opening direction of the door 10 (S113/Yes), the control section 210 advances the process to S117 and, when the direction of the input acceleration is the closing direction of the door 10 (S113/No), the control section 210 advances the process to S125.

When the direction of the input acceleration is the opening direction of the door 10 (S113/Yes), the control section 210 executes control of moving the door 10 in the opening direction (S117).

Subsequently, the control section 210 decides whether or not the door 10 has moved until the door 10 is fully opened (S121), and, when the door 10 is not fully opened (S121/No), performs control of moving the door 10 in the opening direction (S117). Furthermore, when the door 10 has moved until the door 10 is fully opened (S121/Yes), the control section 210 finishes the process.

When the direction of the input acceleration is the closing direction of the door 10 (S113/No), the control section 210 executes control of moving the door 10 in the closing direction (S125).

Subsequently, the control section 210 decides whether or not the door 10 has moved until the door 10 is fully closed (S129) and, when the door 10 is not fully closed (S129/No), performs control of moving the door 10 in the closing direction (S125). Furthermore, when the door 10 has moved until the door 10 is fully closed (S129/Yes), the control section 210 finishes the process.

The operation process example of the control device 20 according to the present embodiment has been described above. According to the above-described control device 20, the control device 20 assists opening or closing of the door 10, so that it is possible to further reduce the user's burden for opening or closing the door 10.

<4. Supplementary Explanation>

Heretofore, the preferred embodiment of the present invention has been described in detail with reference to the appended drawings. However, the present invention is not limited to this embodiment. It should be understood by those who have common knowledge in the technical field to which the present invention belongs that it is obvious that various change examples or alteration examples can be arrived at within the scope of the technical idea recited in the claims, and these change examples and alteration examples also naturally belong to the technical scope of the present invention.

For example, a series of processes of each device described in this description may be realized by using one of software, hardware, and a combination of the software and the hardware. Programs that configure the software are stored in advance in, for example, recording media (non-transitory media) provided inside or outside each device. Furthermore, each program is read on an RAM when, for example, executed by a computer, and is executed by a processor such as a CPU. The above recording media are, for example, a magnetic disk, an optical disk, a magneto-optical disk, and a flash memory. Furthermore, the above computer programs may be distributed via, for example, a network without using the recording media.

What is claimed is:

1. A control device comprising a processor configured to control opening and closing of a structure, wherein the processor controls an opening operation or a closing operation of the structure to match an operation direction of the structure obtained by a first sensor provided to the structure, the processor further controls the closing operation of the structure until the structure is fully closed when the operation direction of the structure obtained by the first sensor is a closing direction, and controls the opening operation of the structure until the structure is fully opened when the operation direction of the structure obtained by the first sensor is an opening direction, when a second sensor different from the first sensor provided to the structure detects a user's contact with the structure, and the first sensor obtains information related to the operation direction of the structure, the processor controls the opening operation or the closing operation of the structure to match the operation direction, the first sensor is an accelerator sensor, the second sensor includes a touch sensor, the structure includes a door, the door is mounted on a movable body, and when a value detected by the acceleration sensor is a threshold or more, the processor performs the opening operation or the closing operation of the structure.

2. The control device according to claim 1, wherein the processor controls the opening operation or the closing operation of the structure when the first sensor obtains information related to the operation direction of the structure as a motion from a state where the structure stops.

3. The control device according to claim 2, wherein the state where the structure stops includes a state where the structure stops at a halfway position of the opening operation or the closing operation of the structure.

4. The control device according to claim 1, wherein, when the second sensor does not detect the user's contact, and the first sensor obtains the information related to the operation direction of the structure, the processor performs control for stopping an operation of the structure.

5. A control method that is executed by a computer, the control method comprising controlling an opening operation or a closing operation of a structure to match an operation direction of the structure obtained by a first sensor provided to the structure, further controlling the closing operation of the structure until the structure is fully closed when the operation direction of the structure obtained by the first sensor is the closing operation, controlling the opening operation of the structure until the structure is fully opened when the operation direction of the structure obtained by the first sensor is the opening direction, when a second sensor different from the first sensor provided to the structure detects a user's contact with the structure, and the first sensor obtains information related to the operation direction of the structure, controlling the opening operation or the closing operation of the structure to match the operation direction, the first sensor is an accelerator sensor, the second sensor includes a touch sensor, the structure includes a door, the door is mounted on a movable body, and when a value detected by the acceleration sensor is a threshold or more, the processor performs the opening operation or the closing operation of the structure.

6. A non-transitory computer readable storage medium having a program stored therein, the program causing a computer to realize a control function configured to control opening and closing of a structure, wherein the control function controls an opening operation or a closing operation of the structure to match an operation direction of the structure obtained by a first sensor provided to the structure, the control function further controls the closing operation of the structure until the structure is fully closed when the operation direction of the structure obtained by the first sensor is a closing direction, and controls the opening operation of the structure until the structure is fully opened when the operation direction of the structure obtained by the first sensor is an opening direction, when a second sensor different from the first sensor provided to the structure detects a user's contact with the structure, and the first sensor obtains information related to the operation direction of the structure, the control function controls the opening operation or the closing operation of the structure to match the operation direction, the first sensor is an accelerator sensor, the second sensor includes a touch sensor, the structure includes a door, the door is mounted on a movable body, and when a value detected by the acceleration sensor is a threshold or more, the processor performs the opening operation or the closing operation of the structure.

* * * * *